July 22, 1958

C. L. EAST 2,844,808

ELECTRICAL CONNECTOR

Filed April 6, 1955

INVENTOR.
CHARLES L. EAST
BY

ATTORNEYS

United States Patent Office 2,844,808
Patented July 22, 1958

2,844,808

ELECTRICAL CONNECTOR

Charles L. East, Healdsburg, Calif.

Application April 6, 1955, Serial No. 499,560

2 Claims. (Cl. 339—244)

This invention relates to electrical connectors of the type broadly comprising an externally threaded bolt having a longitudinal slot and a nut and washer assembly, and more particularly to an improved connector of this type embodying means whereby the nut and washer assembly is not only retained in association with the bolt but whereby the nut of the assembly is at all times and under all conditions of use of the connector positively maintained in threaded engagement with the bolt.

Electrical connectors of the conventional split bolt type are in general use for such purposes as connecting branch or service lines to feeder lines, connecting transformer lines to power supply lines, and the like. In making the connection between a power-carrying line and a service line, the workman necessarily wears gloves of insulating material, and, encumbered in this fashion, as well as with the required installation tools, it is of advantage to him if the components of the electrical conductor are such that they will be retained in association with each other during the step of attaching the connector to the main power line. Prior contributors to the art have recognized this need, and have provided split bolts with various types of extension members attached in a dependent manner to one of the legs of the bolt. These extension members are generally so arranged that when the nut and washer assembly is unthreaded from the bolt and separated from the lower end thereof allow the introduction of the main line into the space between the legs of the bolt so that the assembly is engaged by the extension member and prevented from further movement away from the bolt.

Electrical connectors of the aforesaid conventional type, however, while providing protection against complete disassociation between the nut and washer assembly and the bolt, are disadvantageous in a certain important aspect, since, once the lines have been inserted in these connectors, the nut must be again threadably engaged with the bolt. It is readily apparent that difficulties are frequently encountered by workmen in their attempt to rethread the nut and washer assembly on the bolt, since they are handicapped in so doing, not only by their cumbersome gloves, but by virtue of the fact that the bolt must be grasped with one hand while the other hand is used to engage the nut with the bolt, if the quickest method of assembly is followed.

It is the essential object of the instant invention to overcome the aforedescribed disadvantage of connectors known in the art by providing an electrical connector embodying novel means whereby the bolt and nut elements are maintained in threaded engagement under all conditions of use.

Broadly, this object of the invention is achieved by providing a bridge member across a longitudinal slot in a connector bolt and by providing a lateral passage or slot in communication with said longitudinal slot above said bridge member. Thus, when the transverse portion of a washer, held captive by a nut, straddles or abuts the bridge member, conductors may be passed into the longitudinal slot through the lateral slot while the nut remains in threaded engagement with the bolt.

Other objects and advantages of the instant invention will be apparent from the following description taken in conjunction with the drawing forming part of this specification, and in which.

Figure 1:
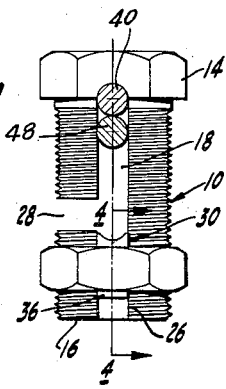
Figure 1 is a view in front elevation of the connector embodied in the invention, showing a pair of conductors in position to be secured together with the connector.
Figure 2:
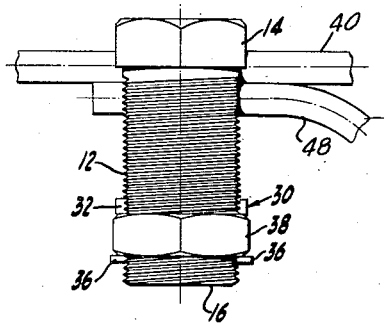
Figure 2 is a view in side elevation of the connector of Figure 1.
Figure 3:
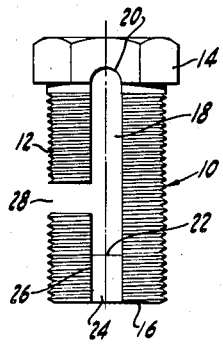
Figure 3 is a view in front elevation of the bolt element of the connector.

Referring to the drawing for more specific details of the invention, the connector is comprised of a bolt indicated generally at 10 provided with external threads 12 and having a polyhedral head 14 and a lower end 16. The bolt is provided with a longitudinal slot 18 extending from an arcuate channel 20 in the underside of the head 14 to an end surface 22 constituting the top of a transverse member or bridge 24 forming, preferably, an integral portion of the bolt. Between the end surface 22 and the lower end 16 of the bolt there is defined by the transverse member 24 a pair of oppositely disposed channels 26 inset from the threaded surface of the bolt and in alignment with the slot 18 and constituting extensions of said slot. A lateral passage or slot 28 through one side of the bolt provides for the introduction of a conductor, or wire, into slot 18.

Figure 4:
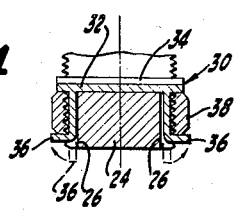
Figure 4 is a fragmentary view in section taken along lines 4—4 of Figure 1, also showing in dotted outline the configuration of the washer element prior to the connection of the same to the nut.

A washer, indicated generally at 30 and having a transverse portion 32 provided with a concave upper surface 34 and legs 36 dependent from said transverse portion, is assembled in relation to bolt 10 by inserting the washer within the slot 18, said washer having a width slightly less than the width of said slot, and by lowering or dropping the washer so that the transverse portion 32 thereof straddles and is supported by transverse member 24 of the bolt, and so that the legs 36 of the washer are received within the channels 26. When so positioned the ends of the transverse portion extend beyond the threaded surface of the bolt. A nut 38 is then threadedly engaged with the bolt and moved upwardly to abut the under-surface of the ends of the transverse portion 32 of the washer, whereupon the washer and nut are made captive by each other by a bending outwardly of the lower ends of the washer legs to form foot portions 36, as shown in Figure 4. It will be noted (Fig. 4) that the legs of said washer are rounded where they are bent outwardly to form said foot portions 36 thereof in order to prevent the edges of the end surface 22 of bridge 24 from interfering with downward movement of said washer legs into the channel extensions 26 of slot 18.

The connector is utilized in the following manner. When the transverse portion 32 of the washer abuts the member 24, the upper surface of the washer does not obstruct the lateral passage or slot 28. Thus, a feeder conductor 40 may be freely introduced into the main slot 18 through the lateral slot 28, and the connector may be hung or suspended on said conductor, with the latter residing in the arcuate channel 20, while a service or branch conductor 48 is prepared for insertion in the slot 18. When the service conductor is inserted within the slot, the nut 38 is screwed upwardly on the bolt to obstruct communication between the slot 28 and that portion in the slot 18 in which the conductors 40 and 48 reside, and to bring the concave surface 34 of the washer into pressing engagement with the conductor 48 and grip said conductors between said surface and the surface of the arcuate channel 20. The connector may then be taped in the conventional manner.

With respect to the specific embodiment of the invention shown in the drawing, it will be understood that the location of lateral slot 28 may be varied as long as the distance between the channel 20 and the upper boundary of slot 28 is sufficient for the accommodation therebetween in slot 18 of the feeder and service conductors; that the distance between the end surface 22 of slot 18 and the lower boundary of slot 28 may be varied in accordance with the particular height of the transverse portions of the washer used, and with the location of slot 28; that while the legs of the washer, before being bent outwardly to form the foot portions thereof, preferably extend below the lower end of the bolt when the washer is supported by the transverse member 24 in order to facilitate access thereto for bending, the legs may be shorter in accordance with the particular height of the nut, the height of the nut being at a minimum when slightly greater than the height of slot 28; and that the distance between end surface 22 and the lower end of the bolt may be less than the height of the nut, as long as the nut remains in thread to a partial extent when the washer abuts surface 22. It is desired, therefore, that the invention be limited only by the scope of the appended claims and the prior teachings of the art.

What I claim as new and desire to secure by Letters Patent is:

1. In an electrical connector comprising an externally threaded bolt bifurcated longitudinally to form two leg portions having an elongated slot therebetween, a member slidable within said slot between said leg portions having a transverse wire seat portion extending outwardly at both ends from said bolt and having a pair of spaced apart depending legs, a nut in threaded engagement with said bolt and in supporting relation to the ends of said seat portion of said member, the lower ends of the legs of said member being bent outwardly to form foot portions to embrace the underside of said nut and to mutually lock said member and nut together for movement with respect to said bolt; means for securing said nut against removal from threaded engagement with said bolt while enabling the insertion of a wire conductor between the leg portions of said bolt comprising a bridge interconnecting the leg portions of said bolt and adapted to be straddled by the legs of said slidable member, said bridge defining with said bolt oppositely directed channels comprising extensions of said slot, the legs of said member above the foot portions thereof being adapted to be disposed within said slot and within said channel extensions thereof, and means defining a laterally directed wire entry slot through one of the leg portions of said bolt, said wire entry slot communicating with the space between said leg portions above said slidable member when said nut is in its lowermost position on said bolt.

2. In an electrical connector as set forth in claim 1, said legs of said member being rounded where they are bent outwardly to form said foot portions to prevent said bridge from interfering with the movement of said legs downwardly into said channel extensions of said slot.

References Cited in the file of this patent

UNITED STATES PATENTS

| 1,186,168 | Buck | June 6, 1916 |
| 1,206,044 | Smart | Nov. 28, 1916 |
| 2,102,881 | Blackburn et al. | Dec. 21, 1937 |
| 2,102,896 | Heinrich | Dec. 21, 1937 |
| 2,197,000 | MacLean | Apr. 16, 1940 |